United States Patent [19]
Todd et al.

[11] Patent Number: 5,853,289
[45] Date of Patent: Dec. 29, 1998

[54] GAS-SUPPLIED PIPE HEATER

[76] Inventors: Herman R. Todd, 4929 Woodview La., Myrtle Beach, S.C. 29575; Larry D. Dickerson, 2960 Hickory Hill Cir., Conway, S.C. 29526

[21] Appl. No.: 907,344

[22] Filed: Aug. 6, 1997

[51] Int. Cl.$^6$ ........................................................ F24J 3/00
[52] U.S. Cl. ........................ 432/225; 432/224; 432/226; 432/230; 432/232
[58] Field of Search .................... 432/224, 225, 432/226, 230, 232, 192, 143, 144

[56] References Cited

U.S. PATENT DOCUMENTS

| | | |
|---|---|---|
| 494,484 | 3/1893 | McRae . |
| 1,407,412 | 2/1922 | Harvey et al. . |
| 2,100,639 | 11/1937 | Doolittle et al. . |
| 2,214,031 | 9/1940 | Rockefeller . |
| 2,366,088 | 12/1944 | Coody ........................................ 432/226 |
| 3,334,879 | 8/1967 | Nordling . |
| 3,761,550 | 9/1973 | Seelfluth ................................... 432/224 |
| 3,776,689 | 12/1973 | Mayo et al. . |
| 3,833,338 | 9/1974 | Badrock . |
| 3,843,858 | 10/1974 | Buell . |
| 3,957,032 | 5/1976 | Jelesko . |
| 4,039,279 | 8/1977 | Horeczko . |
| 4,065,251 | 12/1977 | Croft et al. ............................... 432/144 |
| 4,239,486 | 12/1980 | Gomez ...................................... 432/226 |
| 4,437,453 | 3/1984 | Temple et al. . |
| 4,449,925 | 5/1984 | Williams et al. . |
| 4,515,562 | 5/1985 | Williams . |
| 4,749,843 | 6/1988 | Abramson ................................ 432/224 |
| 5,017,760 | 5/1991 | Amiller . |

*Primary Examiner*—Teresa J. Walberg
*Assistant Examiner*—Jiping Lu
*Attorney, Agent, or Firm*—Michael A. Mann

[57] ABSTRACT

The present invention is a pipe heater that uses a combustible gas burner to provide heat to the pipe. The gas burner permits the heater to be portable and to be used in remote locations where a source of electricity is not readily available. The heater comprises a body adapted so that a pipe can extend therethrough and a burner to bend the pipe. Positioned between the burner and the pipe within the heater is a baffle having a plurality of holes therein. The baffle redirects the heat from the burner around the pipe, thus evenly heating the pipe. The heater is also provided with a control system to regulate the flow of fuel to the burner and potentially with a battery-powered or flint starter device. Furthermore, the body of the heater has air holes positioned in its sides and openings within its bottom to provide an air supply to the burner and to allow the burner to be lit if a starter is not provided or is inoperative.

17 Claims, 2 Drawing Sheets

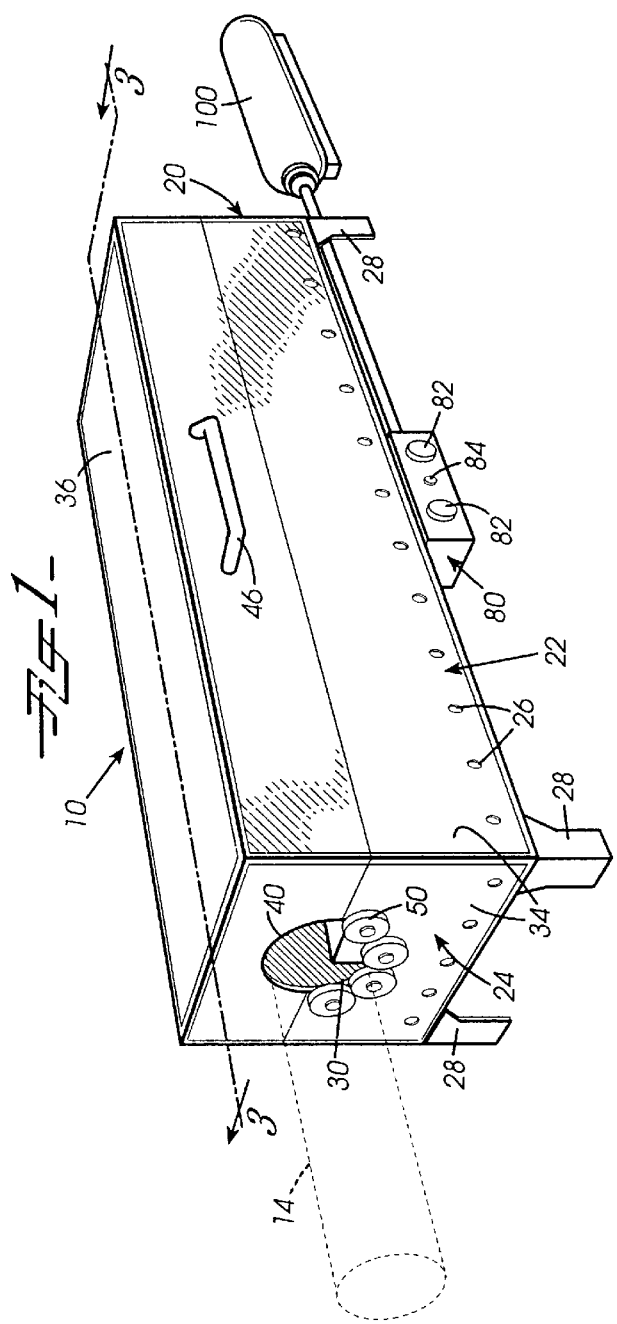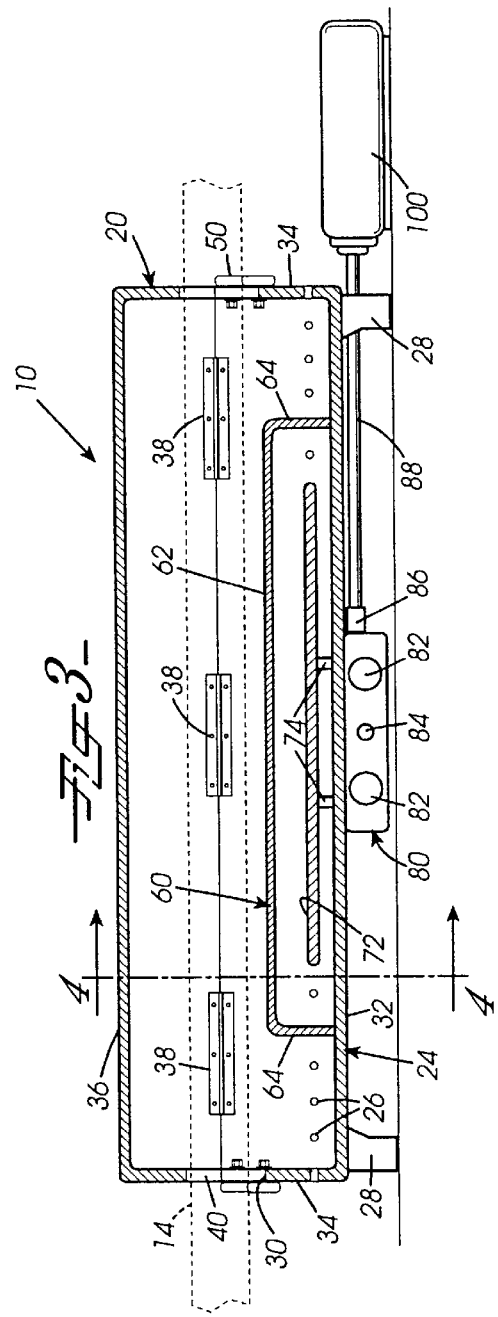

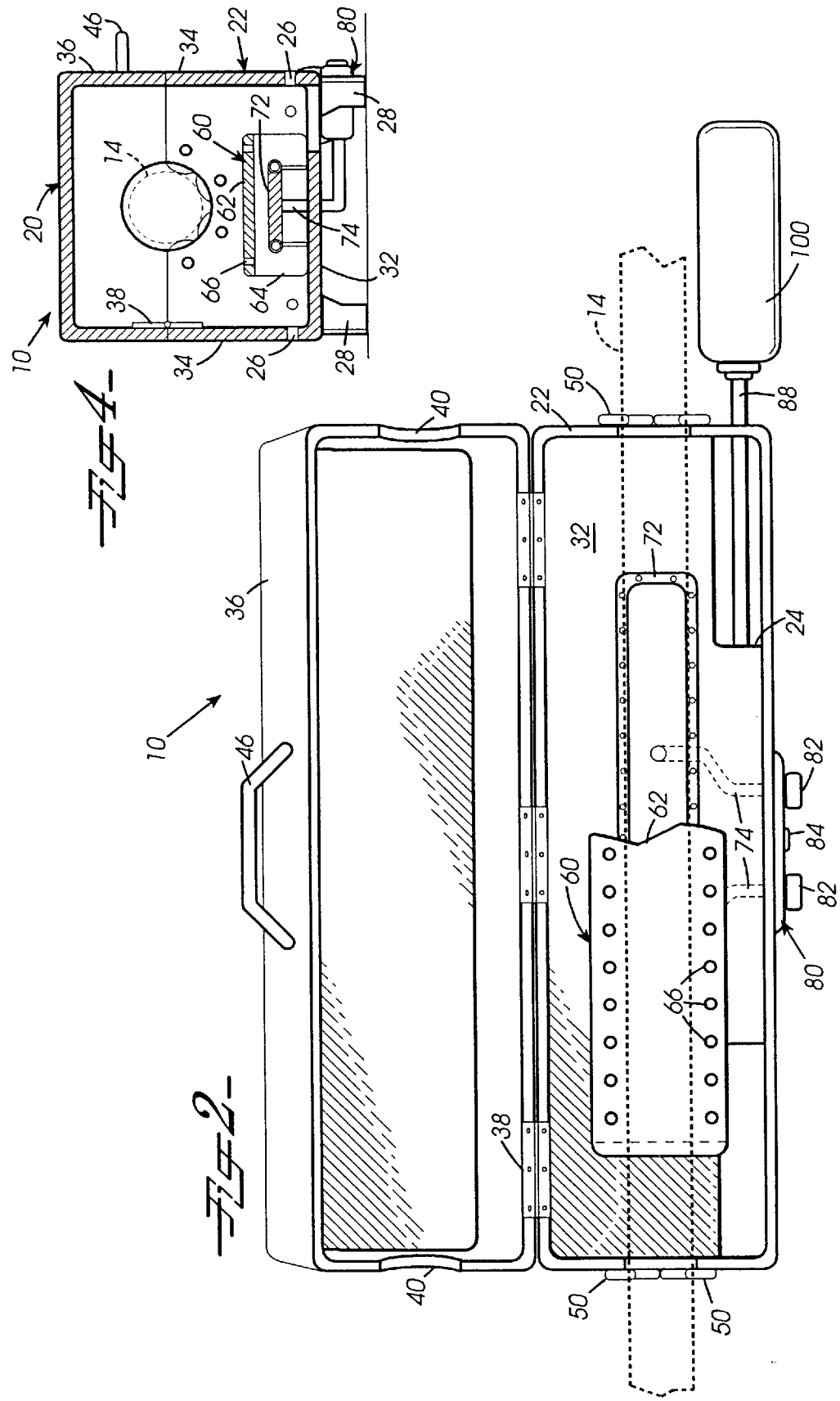

GAS-SUPPLIED PIPE HEATER

BACKGROUND OF THE INVENTION

1. Field of the Invention

The present invention relates to a pipe heater. In particular, the present invention relates to a pipe heater that has a combustible fuel burner and baffle for heating the pipe, so that it may be shaped and bent as desired.

2. Discussion of Background

Polyvinyl chloride (PVC) pipes are used throughout the construction industry for transporting fluids to and from buildings or as piping for plumbing fixtures. When the PVC pipes come from the manufacturer, they are straight and rigid. However, the requirements for installing these pipes and fittings within a building call for piping that changes direction. Consequently, the pipe must be cut and connected by joints so that turns and curves can be made. However, the more joints that are inserted within a given pipe line, the more the integrity of the line is reduced and the number of places where failures or leakage may occur is increased.

Therefore, it is more efficient to bend the pipes to fit the specific curvature that is needed without having to cut individual lengths. However, because the number, sizes, and angles of bends can be numerous, PVC pipes are not typically sold with bends formed therein. Consequently, it is necessary to provide a device that can facilitate and permit the bending of PVC pipes to a desired curvature and shape for a specific task.

There are electric pipe heaters within the prior art that are capable of producing a heated environment to facilitate the bending; however, these heaters require an electrical connection. In the infancy stages of a construction project, electrical power is not always available or is at least in scarce supply. Hence, it is sometimes hard to find the necessary electrical supply. Additionally, it may be necessary to install the PVC pipes before the power is supplied to the building, thus making an electric pipe heater virtually useless. In these situations, it is not unusual to use a hand-held propane flame to heat the PVC pipe. However, because the flame only provides a localized heating and not an even heating, the pipe cannot be accurately bent.

Therefore, there is a need for a pipe heater that is portable and that can provide an evenly distributed heat over the length of the pipe to be bent. In addition, there is a need for a pipe heater that can be used without a ready source of electricity.

SUMMARY OF THE INVENTION

According to its major aspects and broadly stated, the present invention is a pipe heater supplied with combustible fuel for use in heating a length of polyvinyl chloride (PVC) pipe to facilitate bending and forming the length of PVC pipe to a desired shape and curvature. The pipe heater comprises a body having a burner and baffle positioned therein. The body is designed so that a pipe may be positioned within the body and extended therethrough. When in position, the pipe is heated from the heat of combustion and combustion gases emitted by the burner and directed around the pipe by the baffle. In addition, the baffle deflects the burner flame and redirects the rising heat to distribute it so that one portion of the pipe is not heated more quickly than any other, thus providing an even temperature gradient throughout the portion of the pipe that needs to be bent. The body of the heater also has rollers on each end to facilitate the rotation of the pipe within the heater, thus providing more even heating.

A major feature of the present invention is the use of a combustible fuel, such as propane, to heat the pipe. By providing a combustible fuel, the pipe heater becomes portable and does not require electrical connections or other more restrictive elements. Therefore, the pipe heater may be used on construction sites without the use of a drop cord, or in other remote sites where electrical connections are not provided.

Another feature of the present invention is the control system for controlling the amount of fuel provided to the burner. The control system comprises two regulators that control the supply of fuel to a dual burner, thus controlling the area and amount of heat within the heater. The control system also has a quick-connect type fixture that enables the propane or other gas to be connected and disconnected from the heater quickly and easily, thus enhancing the portability of the heater. In addition, the control system can be provided with an electric or flint starter to facilitate the lighting of the burner.

Still another feature of the present invention is the baffle positioned between the burner and the pipe to be heated during the use of the heater. The baffle is basically a flat plate of material suspended above the burner to deflect the heat and combustion gases around the pipe. In other words, the baffle prevents one section of the pipe from being overheated or burned and also redirects and distributes the heat throughout the heater, so that the heater acts as an oven, providing more indirect heat than direct heat.

Yet another feature of the present invention is a plurality of air holes distributed throughout the base of the heater body. The air holes, in conjunction with two openings in the base of the heater, provide air to the interior of the heater, permitting fuel combustion by the burner. In addition, the opening within the bottom of the heater allows the burner to be lighted manually if the automatic starter is inoperative or not part of the specific embodiment of the invention.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a gas-supplied pipe heater with its lid in the closed position, according to a preferred embodiment of the present invention;

FIG. 2 is a top view of a gas-supplied pipe heater with its lid partially open, according to a preferred embodiment of the present invention;

FIG. 3 is a cross-sectional view taken along line 3—3 of FIG. 1 of a gas-supplied pipe heater, according to a preferred embodiment of the present invention; and FIG. 4 is a cross-sectional view taken along line 4—4 of FIG. 3 of a gas-supplied pipe heater, according to a preferred embodiment of the present invention.

DETAILED DESCRIPTION OF A PREFERRED EMBODIMENT

Referring now to the figures, a gas-supplied pipe heater 10 is shown. In the below description of a preferred embodiment, pipe heater 10 will be illustrated and discussed for use in bending a polyvinyl chloride (PVC) pipe 14; however, those of ordinary skill in the art will recognize that other types of pipe which become pliable, malleable, and bendable when exposed to a heat source can be used and bent with pipe heater 10 as described below.

In its preferred embodiment, pipe heater 10 comprises a body 20 having a burner assembly 72 and a baffle 60 positioned therein. During the use of pipe heater 10, a pipe 14 is inserted into heater 10 so that it extends through heater 10 such that the portion to be bent is exposed to an increased temperature, thus increasing the pliability of pipe 14 and enabling it to be easily bent.

Body 20 comprises a base 22 and a lid 36 closable on base 22, and in its preferred embodiment is a rectangular box approximately two feet long, eight inches wide, and eight inches tall. As stated above, pipe 14 extends through heater 10 during its use; therefore, it is necessary to provide first and second cut-out portions 30, 40 within base 22 and lid 36 of body 20 to receive pipe 14. For example, as shown in FIG. 1, first and second cut-out portions 30, 40 in base 22 and lid 36, respectively, are approximately semi-circular, thus permitting pipe 14 to extend through heater 10, while maintaining a large portion of the heat within heater 10. While it is possible to insert pipe 14 through cut-out portions 30, 40 in heater 10, lid 36 is pivotally attached to base 22 by hinges 38, thus providing access to the interior of heater 10 when lid 36 is opened. To facilitate the opening of lid 36, a handle 46, preferably constructed from a heat resistant material, is provided. Additionally, there are a number of legs 28 attached to base 22, so that heater 10 is positioned above the ground.

When pipe 14 is being heated, it may be necessary to rotate pipe 14 along its longitudinal axis, so that pipe 14 is evenly heated. Consequently, positioned along the perimeter of cut-out portion 30 of base 22 are a series of rollers 50 that have an axis of rotation parallel to the longitudinal axis of pipe 14. These rollers 50 facilitate the rotation of pipe 14 and support pipe 14 above cut-out portion 30 in base 22, thus preventing pipe 14 from contacting base 22, which would likely cause damage to pipe 14 because of the direct heat that it would experience from the edge of cut-out portion 30. In addition, rollers 50 should be connected on the exterior of base 22 and designed from a heat-resistant material, in order to prevent heat damage to rollers 50.

Base 22 also has a plurality of holes 26 in its sides 34 and openings 24 in its bottom 32, the purpose of which will be described in detail below. Positioned on bottom 32 of base 22 is a combustible fuel burner assembly 72 that is connected to a control system 80 for regulating the supply of fuel to burner assembly 72 for combustion, and thus regulating the temperature within heater 10. Control system 80 has a quick connect fitting 86 which is connected to a fuel conduit 88 supplying fuel to burner assembly 72. There are several methods of supplying fuel to burner assembly 72, and in the figures one method is depicted by a tank 100 containing a pressurized fuel source, such as propane. However, it will be recognized that several different types of fuel may be used, and that there are numerous methods of supplying fuel to heater 10 while still maintaining the portability and remote convenience of heater 10.

As fuel enters control system 80 from fuel conduit 88, it is directed to burner assembly 72 through a pair of regulators 82 having knobs thereon, in order to provide easy control of the flow of fuel into burner assembly 72. As the fuel leaves control system 80 it enters burner assembly 72 through two channels 74 extending from control system 80. In the preferred embodiment, burner assembly 72 is a dual burner, thus receiving fuel from both channels; however, it will be recognized that a single source burner could be used, or any other type of combustible fuel burner that produces sufficient heat from the combustion of fuel. In addition to knobs on regulators 82 on control system 80, heater 10 could be provided with a temperature gauge, so that knobs on regulators 82 could be adjusted to more accurately regulate the temperature within heater 10.

Positioned between pipe 14 and burner assembly 72 is baffle 60, which distributes the heat from burner assembly 72 so that flames of combustion do not directly heat pipe 14 but are redirected around it by baffle 60, away from pipe 14, thus preventing localized heating of pipe 14. Baffle 60 basically comprises a flat plate 62 that is dimensioned to extend over the top surface of burner assembly 72, as specifically shown in FIG. 2. Baffle 60 is supported in this positioned by a pair of feet 64 located at either of its ends. Baffle 60 also has a plurality of holes 66 that are positioned proximate to the edges along the length of baffle 60. In addition, these holes 66 should be formed and located in baffle 60 so that holes 66 are outside of pipe 14, as shown in FIG. 2. This prevents flames and combustion gases from rising through holes 66 and directly contacting pipe 14. In other words, baffle 60 and its holes 66 redirect the flames, heat, and combustion gases from burner assembly 72 around pipe 14, thus heating pipe 14 with indirect heat rather than direct heat. The indirect heat enables pipe heater 10 to function much like an oven, thus evenly heating pipe 14 and making it more pliable throughout the entire length of the desired bend.

Openings 24 within bottom 32 of base 22 serve two functions. First, openings 24 work in conjunction with air holes 26 in sides 34 of base 22 to provide an air supply to burner assembly 72. Second, openings 24 are large enough and positioned proximate to burner assembly 72 so that they can be used for access to light burner assembly 72. For example, when using a match, lighter, or other igniter, a person can position the spark or flame proximate to burner assembly 72, thus igniting burner assembly 72. Additionally, it is contemplated that a starter switch 84 could be designed with control system 80. Starter switch 84 could activate an ignition spark by electric (battery) or flint means to ignite burner assembly 72 without a person having to be near burner assembly 72.

In use, fuel is supplied to burner assembly 72 and then ignited to begin the heating of heater 10. Pipe 14 is then positioned within cut-out portion 30 of base 22 resting on rollers 50, with the section of pipe 14 that is to be bent centered within heater 10. Once heater 10 is at the desired temperature, controlled by the knobs on regulators 82, pipe 14 is rotated about its longitudinal axis to assure an even heating of pipe 14. However, with the use of baffle 60, the likelihood of unevenly heating pipe 14 or localized heating from direct contact of flame or combustion gases is greatly reduced. Once pipe 14 is heated and pliable enough to be bent, pipe 14 is removed from heater 10 by lifting lid 36, and the pipe 14 is shaped and formed into the desired shape by hand. It will also be recognized by those of ordinary skill in the art that the design and dimensions of body 20, including base 22 and lid 36, could be changed or modified without departing from the spirit and scope of the present invention.

It will be apparent to those skilled in the art that many changes and substitutions can be made to the preferred embodiment herein described without departing from the spirit and scope of the present invention as defined by the appended claims.

What is claimed is:

1. A heater for softening polyvinyl chloride (PVC) pipe to facilitate bending said pipe, said heater comprising:

a body having means formed therein for inserting a length of PVC pipe;

roller means carried by said body for facilitating rotation of said PVC pipe;

a burner assembly positioned within said body so that when said PVC pipe is inserted within said body and said burner assembly is ignited, flames from combustion of fuel by said burner assembly heat said pipe; and baffle means for distributing heat from said burner assembly, said baffle means positioned within said body and adjacent to said burner assembly so that when said PVC pipe is inserted in said body, said baffle means is located between said burner assembly and said PVC pipe.

2. The heater as recited in claim 1, further comprising control means in said body for regulating combustion of fuel by said burner assembly.

3. The heater as recited in claim 1, further comprising a fuel tank in operational connection with said burner assembly.

4. The heater as recited in claim 1, wherein said burner assembly further comprises two burners.

5. The heater as recited in claim 1, wherein said baffle means further comprises a plate having a plurality of holes formed therein.

6. A heater for softening polyvinyl chloride (PVC) pipe to facilitate bending said pipe, said heater comprising:

a body having
  a lid,
  a base, said lid closable on said base, and
  cutout portions in said body for inserting a length of PVC pipe so that when said lid is closed on said base, said length of PVC pipe extends from said body;
  roller means carried by said body at said cutout portions for facilitating the rotation of said PVC pipe;

a burner assembly positioned within said body so that when said PVC pipe is inserted within said body and said burner assembly is ignited, flames from combustion of fuel by said burner assembly heat said pipe; and baffle means for distributing heat from said burner assembly, said baffle means positioned within said body and adjacent to said burner assembly so that when said PVC pipe is inserted in said body, said baffle means is located between said burner assembly and said PVC pipe.

7. The heater as recited in claim 6, further comprising control means in said body for regulating combustion of fuel by said burner assembly.

8. The heater as recited in claim 6, further comprising a regulator in operative connection with said burner assembly for regulating combustion of fuel by said burner assembly; and a fuel tank in fluid connection with said burner assembly and said regulator for supplying fuel to said burner assembly.

9. The heater as recited in claim 7, further comprising a fuel tank in said body and in fluid connection with said burner assembly for supplying fuel to said burner assembly; and means carried by said body for igniting said fuel from said fuel tank.

10. The heater means as recited in claim 6, wherein said cutout portions further comprise a first cutout portion carried by said base and a second cutout portion carried by said base, said first and said second cutout portions adapted to receive said length of PVC pipe so that said length of PVC pipe extends from said base, said base further comprising rollers carried at said cutout portions so that said length of PVC pipe, when placed on said base at said cutout portions on said rollers, can rotate freely on said rollers.

11. The heater as recited in claim 6, wherein said burner assembly further comprises two burners.

12. The heater as recited in claim 6, wherein said baffle means further comprises a plate.

13. The heater as recited in claim 6, wherein said baffle means further comprises a plate having a plurality of holes formed therein for heat to pass therethrough.

14. A heater for softening polyvinyl chloride (PVC) pipe to facilitate bending said pipe, said heater comprising:

a body having
  a lid,
  a base, said lid closable on said base, and
  cutout portions in said base for inserting a length of PVC pipe so that when said lid is closed on said base, said length of PVC pipe extends from said body;
  roller means carried by said base at said cutout portions for facilitating the rotation of said PVC pipe;

a burner assembly positioned within said body so that when said PVC pipe is inserted within said body through said cutout portions of said base and said burner assembly is ignited, flames from combustion of fuel by said burner assembly heat said pipe;

a baffle having a plurality of holes formed therein, said baffle for distributing heat from said burner assembly, said baffle means positioned within said body and adjacent to said burner assembly so that when said PVC pipe is placed in said body, said baffle means is located between said burner assembly and said PVC pipe;

a fuel tank carried by said body and in operational connection with said burner assembly; and means for controlling the flow of fuel from said tank to said burner assembly.

15. The heater as recited in claim 14, wherein said body has a plurality of holes formed therein for admission of air for combustion by said burner assembly.

16. The heater as recited in claim 14, wherein said controlling means further comprises a regulator in fluid connection with said fuel tank and said burner assembly.

17. The heater as recited in claim 14, wherein said controlling means further comprises a temperature guage carried by said body for regulating the temperature of said heater.

* * * * *